Feb. 3, 1970     A. H. LARSON     3,493,333
PREPARATION OF ANHYDROUS MAGNESIUM CHLORIDE
Filed Dec. 28, 1967
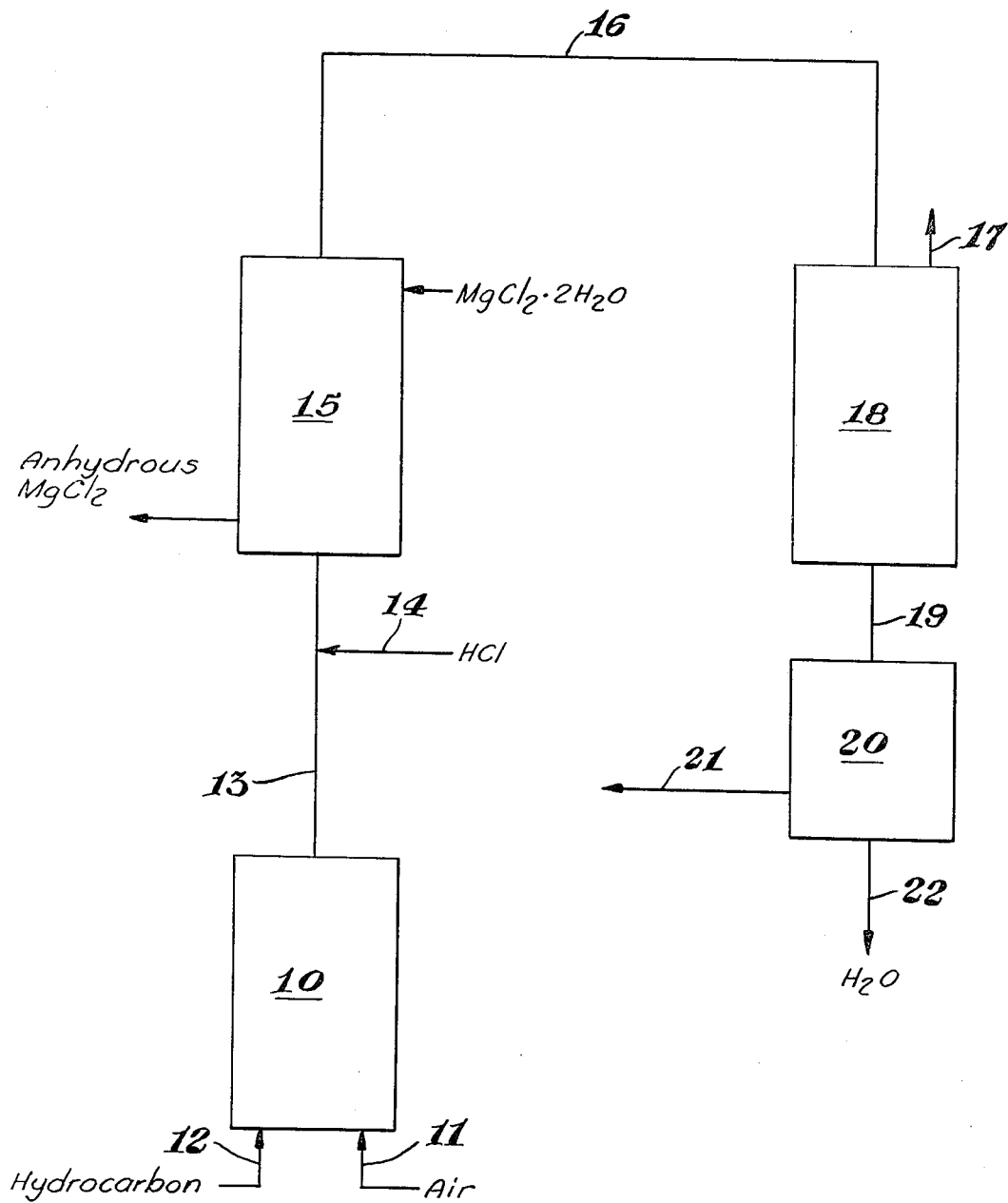
INVENTOR.
Andrew H. Larson
BY
ATTORNEY

United States Patent Office 3,493,333
Patented Feb. 3, 1970

3,493,333
PREPARATION OF ANHYDROUS MAGNESIUM CHLORIDE
Andrew H. Larson, Golden, Colo., assignor to The Dow Chemical Company, Midland, Mich., a corporation of Delaware
Filed Dec. 28, 1967, Ser. No. 694,199
Int. Cl. C01f 5/34
U.S. Cl. 23—91                        3 Claims

ABSTRACT OF THE DISCLOSURE

This invention relates to a process for removing the water of hydration from magnesium chloride without the concomitant production of a substantial proportion of magnesium oxide by contacting hydrated magnesium chloride with gaseous hydrogen chloride, preferably in admixture with air and water vapor, at a temperature of between about 350° C. and about 525° C., produced by direct heating.

---

This invention relates to an improved process for the preparation of anhydrous magnesium chloride and more particularly relates to a process for removing the last two molecules of water of hydration from magnesium chloride without hydrolyzing a significant proportion of the magnesium chloride to magnesium oxide.

Anhydrous magnesium chloride is a highly desirable industrial product and therefore many processes have been proposed for removing the water of hydration therefrom. None of the processes developed thus far have been completely satisfactory, however, in that such processes are unduly expensive, employ indirect heat exchange methods of heating the magnesium chloride or such processes coproduce significant proportions of magnesium oxide or magnesium oxychloride which renders the magnesium chloride undesirable for many purposes.

It is an object of this invention to provide an improved and economical process for the dehydration of hydrated magnesium chloride. A further object is to provide a process for the production of anhydrous magnesium chloride without the simultaneous production of a significant proportion of magnesium oxide or magnesium oxychloride. These and other objects and advantages of the present process will become apparent from a reading of the following detailed specification.

It has now been discovered that anhydrous magnesium chloride is produced from hydrated magnesium chloride by contacting such hydrated magnesium chloride with gaseous hydrogen chloride, preferably in combination with air and water vapor, at a temperature of between about 350° C. and about 525° C., produced by direct heating of the magnesium chloride with hot gases.

The Figure provided herein is a schematic flow diagram showing a preferred embodiment of the invention.

Magnesium chloride usually occurs in crystalline form associated with about 6 molecules of water ($MgCl \cdot 6H_2O$). As is well known in the art, general dehydration processes will effectively remove about 4 molecules of water without undesirable side reactions such as the formation of magnesium oxide or magnesium oxychloride. Therefore, while $MgCl \cdot 6H_2O$ may be used as feed material to the process of this invention, and anhydrous $MgCl_2$ is produced thereby, it is usually preferable to employ known thermal processes to produce $MgCl_2 \cdot 2H_2O$ or $MgCl_2 \cdot H_2O$ and use the dihydrate or monohydrate of magnesium chloride as feed to the process defined herein.

While particle size of the hydrated magnesium chloride for use herein is not critical to the operation of the processes, it is desirable to employ relatively small particles e.g. from about 4 to 20 mesh (Standard Sieve Size), rather than large particles or extremely fine powders.

In order to produce anhydrous magnesium chloride according to the process of this invention, it has been found necessary to contact the hydrated magnesium chloride with a gaseous mixture containing HCl at a temperature of between about 350° C. and about 525° C., preferably between about 425° C. and 475° C. Temperatures below about 350° C. require an undesirably long time to remove the water of hydration from the magnesium chloride and temperatures above about 525° C. produce undesirably large proportions of magnesium oxide and/or magnesium oxychloride even when high proportions of HCl are employed in the gas phase.

While other methods of directly heating the reaction of dehydration zone may be employed, it is preferred to burn a hydrocarbon in an excess of air, add gaseous HCl to the combustion products thereof and pass the hot gaseous mixture containing HCl into contact with the hydrated magnesium chloride. In this manner, the magnesium chloride to be converted can be heated to reaction temperature and maintained at such temperature with hot combustion gas while being simultaneously dehydrated. The temperature in the reaction zone is thereby easily controlled by controlling the hydrocarbon combustion and this method eliminates any need for external heating.

Excess air is employed in the combustion reaction zone as a carrier for the heat produced and as a method of temperature control. This excess air mixed with the water vapor produced by the combustion reaction, when mixed in the defined proportions with gaseous HCl, provides advantages in the dehydration reaction and the presence of nitrogen and other combustion products of the combustion reactor, i.e. CO and $CO_2$, have no detrimental effect. Therefore, the use of a gaseous mixture of HCl and air with the hot combustion gases from hydrocarbon combustion when contacted in the defined temperature range with hydrated magnesium chloride provides an unexpectedly effective method for dehydrating such magnesium chloride to the anhydrous state.

During the dehydration reaction it is preferred to employ a volume ratio of air to HCl of from about 1:1 to about 30:1. Ratios of air to HCl of greater than 30:1 may be employed but much longer reaction or treatment times are required to remove the water of hydration from the magnesium chloride. Ratios of less than 1:1 may likewise be employed and HCl in the absence of air may be used but larger proportions of HCl are required and temperature control of the hot gases is more difficult.

The volume ratio of HCl to water vaper in the gas mixture employed during the reaction is preferably at least 4:1. At volume ratios of HCl to water of less than 4:1, reaction times become much longer and the conversion of magnesium chloride to magnesium oxide and magnesium oxychloride begins to increase sharply.

One preferred embodiment of the invention is shown in the attached drawing wherein a hydrocarbon such as natural gas or fuel oil is fed through line 12 into a combustion chamber 10 where it is mixed with air supplied through line 11 and burned to produce hot combustion gases. The combustion gases thus produced pass from combustion chamber 10 through line 13 where they are mixed with gaseous HCl supplied through line 14 and the mixture of combustion gases and HCl passes into the dehydration reactor 15. Hydrated magnesium chloride may be added to the dehydration reactor 15 either as a single charge which is dehydrated in batch fashion and replaced after dehydration or hydrated magnesium chloride may be continuously fed into a moving or fluidized bed and continuously withdrawn therefrom as shown in this figure. The hot gases together with the additional water of hydration from the magnesium chloride pass from the reactor through line 16 and into condenser 18 where the water and HCl are condensed and the remaining gases are vented through line 17. Condensed water and HCl are then passed through line 19 to a separator 20 where the water is discarded through line 22 and the HCl is recycled through line 21 for reuse in the dehydration step.

While contact time varies to some extent with temperature, flow rate of the gases, design of the dehydration reactor, particle size of the magnesium chloride and efficiency of the contact between the magnesium chloride and the hot gases, a contact time between about 5 and 30 minutes has been found to usually be sufficient.

The following examples are provided to further illustrate the invention and to provide specific embodiments thereof but are not to be construed as limiting to the scope of the invention defined herein.

EXAMPLE 1

In order to demonstrate the invention a number of experiments were conducted according to the following general procedure.

Into a Vycor dehydration reactor was placed 10 gm. of $MgCl_2 \cdot 2H_2O$ supported on a perforated Vycor plate. The hydrated magnesium chloride had a particle size of −6 to +14 mesh and an analysis in weight percent as follows: 65.8% $MgCl_2$, 1.6% MgO, 1.5% of other metal salts and 31.1% $H_2O$. A mixture of gases simulating the gases obtained from the combustion of methane with air were mixed with gaseous HCl, heated and passed through the bed of $MgCl_2$ to fluidize the bed and to bring it up to the desired temperature. At the end of the reaction time, the product magnesium chloride was cooled and analyzed by dissolving it in an excess of hydrochloric acid and back titrating with NaOH to determine the total alkalinity. The alkalinity is calculated and expressed as weight percent MgO. The results of these experiments are shown in the following table:

TABLE

| Experiment No. | Influent gas temp. (° C.) | Reaction time (min) | Gas Vol. Measured at 21° C. | | | Vol. ratio $HCl/H_2O$ | Vol. ratio Air/HCl | Linear gas vel. (ft./sec.) | percent MgO |
|---|---|---|---|---|---|---|---|---|---|
| | | | Air (cc./min.) | HCl (cc./min.) | $H_2O$ (cc./min.) | | | | |
| 1 | 393 | 10 | 18,100 | 0 | 330 | 0 | — | 2.52 | 29.8 |
| 2 | 392 | 10 | 16,400 | 1,680 | 330 | 5.1 | 9.8 | 2.52 | 1.78 |
| 3 | 394 | 20 | 16,400 | 1,680 | 330 | 5.1 | 9.8 | 2.52 | 1.24 |
| 4 | 396 | 10 | 16,400 | 1,680 | 0 | ∞ | 9.8 | 2.48 | 1.25 |
| 5 | 450 | 10 | 16,400 | 1,700 | 0 | ∞ | 9.6 | 2.68 | 0.42 |
| 6 | 452 | 10 | 16,400 | 1,700 | 340 | 5.1 | 9.6 | 2.75 | 1.33 |
| 7 | 452 | 15 | 16,400 | 1,750 | 340 | 5.1 | 9.4 | 2.75 | 1.14 |
| 8 | 452 | 20 | 16,400 | 1,750 | 340 | 5.1 | 9.4 | 2.75 | 0.97 |
| 9 | 454 | 15 | 16,400 | 1,700 | 0 | ∞ | 9.6 | 2.70 | 0.35 |
| 10 | 452 | 20 | 16,400 | 1,750 | 0 | ∞ | 9.6 | 2.71 | 0.05 |
| 11 | 448 | 10 | 17,600 | 540 | 390 | 1.4 | 32.6 | 2.73 | 6.95 |
| 12 | 502 | 10 | 15,300 | 1,750 | 300 | 5.8 | 8.7 | 2.76 | 1.27 |
| 13 | 500 | 10 | 15,300 | 1,750 | 300 | 5.8 | 8.7 | 2.75 | 1.32 |
| 14 | 556 | 10 | 14,200 | 1,470 | 320 | 4.6 | 9.6 | 2.72 | 9.76 |
| 15 | 442 | 10 | 18,100 | 300 | 360 | 0.83 | 60.4 | 2.97 | 18.90 |
| 16 | 460 | 10 | 17,000 | 1,500 | 0 | ∞ | 11.3 | 2.77 | 0.44 |
| 17 | 458 | 10 | 17,000 | 750 | 0 | ∞ | 22.7 | 2.65 | 0.97 |
| 18 | 462 | 20 | 17,000 | 750 | 0 | ∞ | 22.7 | 2.66 | 0.71 |
| 19 | 456 | 10 | ¹17,300 | 0 | 0 | 0/0 | — | 2.58 | 16.93 |

¹ Argon.

It should be noted that Experiments No. 1, 11, 14, 15 and 19 are control runs to demonstrate the effect on the proportion of magnesium oxide in the product when conditions other than those defined by the invention herein are employed.

The same results should be obtained when the actual hot gases from the combustion of a hydrocarbon in air mixed with HCl are employed under the same conditions.

Various modifications can be made in the present invention without departing from the spirit or scope thereof for it is understood that I limit myself only as defined in the appended claims.

I claim:
1. A process for the production of anhydrous magnesium chloride from hydrated magnesium chloride with a gaseous mixture containing air, water vapor and HCl at a temperature of between about 350° and about 525° C., for a time sufficient to substantially remove the water of hydration from said magnesium chloride wherein said heating is produced by directly contacting said magnesium chloride with hot gases produced from the combustion of a hydrocarbon and wherein the volume ratio of air to HCl in said gaseous mixture is from 1:1 to 30:1 and the volume ratio of HCl to $H_2O$ is at least 4:1.

2. The process according to claim 1 wherein the temperature is between about 425° C. and 475° C.

3. The process according to claim 1 wherein the hydrated magnesium chloride to be dehydrated contains two moles of water per mole of $MgCl_2$ or less.

References Cited
UNITED STATES PATENTS

| | | | |
|---|---|---|---|
| 1,479,982 | 1/1924 | Collings et al. | 23—91 |
| 1,557,660 | 10/1925 | Cottringer et al. | 23—91 |
| 1,852,227 | 4/1932 | Barstow et al. | 23—91 |
| 1,880,505 | 10/1932 | Smith | 23—91 |
| 1,896,406 | 2/1933 | Heath | 23—91 |
| 3,338,668 | 8/1967 | Lyons et al. | 23—91 |
| 3,346,333 | 10/1967 | Nadler | 23—91 |
| 3,395,977 | 8/1968 | Nadler | 23—91 |

EDWARD STERN, Primary Examiner

PO-1050
(5/69)

UNITED STATES PATENT OFFICE
CERTIFICATE OF CORRECTION

Patent No. 3,493,333     Dated February 3, 1970

Inventor(s) Andrew H. Larson

It is certified that error appears in the above-identified patent and that said Letters Patent are hereby corrected as shown below:

Col. 4, line 43, after "chloride" second occurrence insert th phrase --which comprises contacting hydrated magnesium chloride--.

Singed and sealed this 26th day of March 1974.

(SEAL)
Attest:

EDWARD M.FLETCHER,JR.
Attesting Officer

C. MARSHALL DANN
Commissioner of Patents